2,661,563

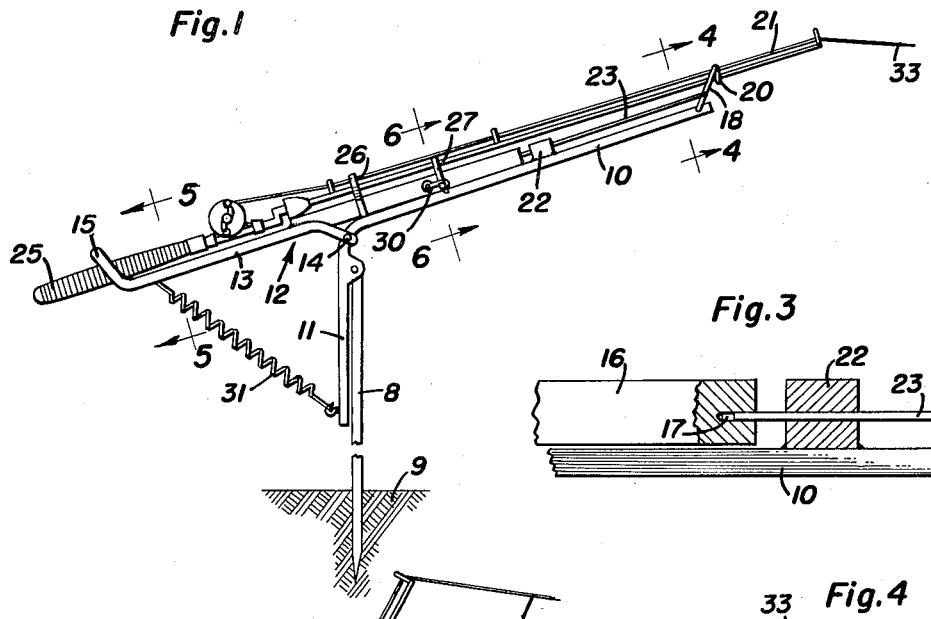
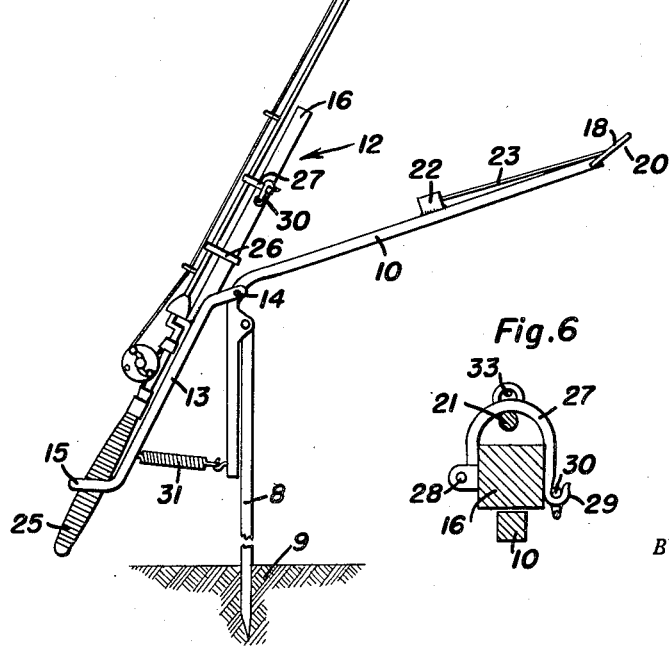
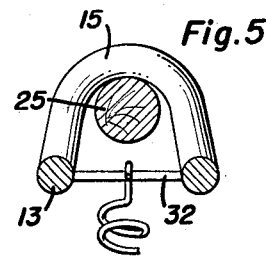
Dec. 8, 1953     G. D. ADAMS, JR., ET AL     2,661,563
FISHING ROD HOLDER
Filed Dec. 17, 1951
George D. Adams, Jr.
Hermon L. Humphries
INVENTORS Patented Dec. 8, 1953

UNITED STATES PATENT OFFICE 2,661,563

FISHING ROD HOLDER

Hermon L. Humphries and George D. Adams, Jr., Gotebo, Okla.; said Adams assignor to E. H. McDonald, Oklahoma City, Okla.

Application December 17, 1951, Serial No. 262,092

4 Claims. (Cl. 43—16)

1

The present invention relates to new and useful improvements in fishing rod holders and has for its primary object to provide, in a manner as hereinafter set forth, a device of this character comprising novel means for instantly and automatically setting the hook in the fish when it strikes or takes the bait.

Other objects of the invention are to provide a fishing rod holder of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing a fishing rod holder constructed in accordance with the present invention in use;

Figure 2 is a side elevational view, showing the device after it has been sprung;

Figure 3 is a detail view, partially in section, showing the means for releasably securing the rockable rod supporting rack in lowered position;

Figure 4 is a cross sectional view, taken substantially on the line 4—4 of Figure 1;

Figure 5 is a cross sectional view, taken substantially on the line 5—5 of Figure 1; and Figure 6 is a cross sectional view, taken substantially on the line 6—6 of Figure 1.

Referring now to the drawing in detail, it will be seen that the embodiment of the invention which has been illustrated comprises a spike 8 which is adapted to be driven into the ground, as at 9. Mounted on the upper portion of the spike 8 is an upwardly inclined arm 10. The arm 10 includes an angularly extending lower end portion 11 which is pivotally secured to the spike 8.

Rockably mounted on the arm 10 is a fishing rod rack or unit which is designated generally by reference numeral 12. The rockable rack 12 comprises an elongated loop portion 13 formed from a suitable metallic rod having one end portion pivotally secured at 14 to the arm 10 at the angle or bend thereof. At its free end, the elongated loop 13 terminates in an angularly extending bight portion 15.

The rack 12 further includes a forwardly projecting bar 16 which is fixed to the forward or

2 pivotally mounted end portion of the loop 13. The forward end portion of the bar 16 has formed longitudinally therein a socket or bore 17 (see Figure 3) the purpose of which will be presently set forth.

Pivotally mounted for vertical swinging movement on the forward or free end portion of the inclined arm 10 is a substantially U-shaped bracket 18 of suitable wire. In the embodiment shown, the bracket 18 includes inturned end portions 19 (see Figure 4) which are journalled in sockets provided therefor in the arm 10. The bracket 18 further includes a substantially U-shaped bight portion 20 for the reception of the forward end portion of a conventional fishing rod 21.

Fixed on the arm 10 at an intermediate point is a guide 22. One end portion of a trigger 23 in the form of a metallic rod extends slidably through the guide 22. The trigger 23 is engageable in the socket 17 in the bar 16 for releasably securing the rack 12 in a lowered position on the arm 10 as shown in Figure 1 in the drawing.

At its other end, the trigger 23 is provided with a T-head 24 which is pivotally secured between the legs of the bracket 18.

When the fishing rod 21 is mounted on the rack 12, the handle 25 of said rod is engaged in the angularly turned bight portion 15 of the loop 13. The inner portion of the rod 21 rests on the bar 16 where it is secured by means including a resilient clamp 26. The rod is further secured by a latch 27 (see Figure 6) having one end pivotally secured at 28 to the bar 16. At its free end, the latch 27 terminates in a hook 29 with which a suitable keeper 30 is engageable for securing said latch in a closed position over the rod 21.

A suitable coil spring 31 has one end connected to the lower portion 11 of the arm 10 and its other end connected, as at 32, to the loop 13 of the rack 12.

It is thought that the manner in which the device is used will be readily apparent from a consideration of the foregoing. Briefly, to mount the rod 21 on the device, the handle 25 is inserted in the bight portion 15 of the loop 13 and said rod is forced into the resilient clamp 26 on the bar 16. The latch 27 is then swung over the rod 21 and secured. The rack 12 is then swung in a vertical plane on the arm 10 against the tension of the coil spring 31 until the bar 16 comes to rest on said arm and the outer portion of the rod 21 is engaged in the bight portion 20 of the swingable member 18. When in position to receive the rod 21, the member 18 extends upwardly at an inclination from the arm 10 and the trigger 23 is engaged in the socket 17 for securing the rack 12 in a set position against the tension of the spring 31. Now, when a fish strikes and pulls or tugs on the line 33, the rod 31 is flexed downwardly for actuating the bracket 18. In this manner the trigger 23 is withdrawn from the socket 17 for releasing the rack 12, which with the rod 21 firmly secured in position thereon, is instantly swung upwardly by the coil spring 31 for setting the hook in the fish.

It is believed that the many advantages of a fishing rod holder constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

Having described the invention, what is claimed as new is:

1. In a fishing rod holder including a support, a rack pivotally mounted at an intermediate point, for swinging movement in a vertical plane on the support, means for securing a fishing rod in position on said rack, a spring connected to one end portion of the rack and to said support for actuating said rack in a direction to elevate the forward end of the rod, and means operable by the rod and engageable with the other end of the rack for releasably securing said rack against actuation by the spring, the last named means including a bracket pivotally mounted on said support and including a substantially U-shaped portion for the reception of the rod, and a trigger slidably mounted on the support and pivotally connected to the bracket for actuation thereby, said trigger being engageable with said other end of the rack for securing the same against swinging movement on said support.

2. In a fishing rod holder including a support and a vertically swingable rack carried by the support, spring means for swinging the rack in a direction to elevate a rod held thereon, means retaining the rack against swinging movement until a fish strikes the line on a rod held on the rack, said means comprising a guide fixed to the support, a rod element slidably carried by the guide, said rack having a blind bore adapted to receive the rear end of said rod, and a pivotal fishing rod supporting member pivotally connected to the support and engaging the forward end of said rod element to retract the rod element from the bore as the member is swung downwardly and forwardly.

3. In a fishing rod holder including a support and vertically swingable rack carried by the support, spring means for swinging the rack in a direction to elevate a rod held thereon, means retaining the rack against swinging movement until a fish strikes the line on a rod held on the rack, said means comprising a guide fixed to the support, a rod element slidably carried by the guide, said rack having a blind bore adapted to receive the rear end of said rod, a U-shaped wire bracket pivotally connected to the support and forming a fishing rod rest, said rod element extending through the bracket, and a cross bar at the forward end of said rod element engaged with the bracket, said bracket being adapted to be swung forwardly and downwardly from a vertical position in response to downward flexing of a fishing rod on the rack, in order to pull the rod element forwardly out of engagement with the rack.

4. A fishing rod holder of the character described comprising a support, a rack pivotally mounted at an intermediate point, for swinging movement in a vertical plane on the support, means for securing a fishing rod in position on said rack, a spring connected to one end portion of the rack and to said support for actuating said rack in a direction to elevate the forward end of the rod, and means operable by the rod and engageable with the other end of the rack for releasably securing said rack against actuation by the spring, said last named means including a sliding rod carried by the support and engageable with the rack and a swingable pole rest on the support engaged with the sliding rod to retract the same relative to the rack.

HERMON L. HUMPHRIES.
GEORGE D. ADAMS, Jr.

References Cited in the file of this patent

UNITED STATES PATENTS

| Number | Name | Date |
|---|---|---|
| D. 157,716 | Wortman | Mar. 14, 1950 |
| 1,957,853 | Sibley | May 8, 1934 |
| 2,293,305 | Oldham | Aug. 18, 1942 |
| 2,551,996 | Cherubini | May 8, 1951 |

FOREIGN PATENTS

| Number | Country | Date |
|---|---|---|
| 7,759 | Great Britain | 1893 |